United States Patent [19]

Ishimura et al.

[11] Patent Number: 4,793,299
[45] Date of Patent: Dec. 27, 1988

[54] ENGINE CYLINDER BLOCK REINFORCING STRUCTURE

[75] Inventors: Fuminori Ishimura; Hiroshi Kagaya; Kazuaki Nishimura; Takafumi Teramoto, all of Hiroshima, Japan

[73] Assignee: Mazda Motor Corporation, Hiroshima, Japan

[21] Appl. No.: 70,780

[22] Filed: Jul. 7, 1987

[30] Foreign Application Priority Data

Jul. 8, 1986 [JP] Japan .................... 61-104657[U]

[51] Int. Cl.$^4$ ............................................. F16M 1/026
[52] U.S. Cl. ............................. 123/195 R; 123/195 A
[58] Field of Search ..................... 123/195 R, 195 A

[56] References Cited

U.S. PATENT DOCUMENTS 2,796,857  6/1957  Johansson ..................... 123/195 R
3,100,028  8/1963  Booth et al. .
3,189,126  6/1965  May ............................. 123/195 R
3,653,464  4/1972  Jacobsen et al. .
3,841,203  10/1974 Bruce .

FOREIGN PATENT DOCUMENTS

55-40360  9/1980  Japan .
1422703   1/1976  United Kingdom .

Primary Examiner—Willis R. Wolfe
Assistant Examiner—M. Macy
Attorney, Agent, or Firm—Burns, Doane, Swecker & Mathis

[57] ABSTRACT

An engine cylinder block structure includes: a cylinder block integrally formed to include skirts projecting downwardly from both sides of the lower surface of the cylinder block; an oil pan attached to lower surfaces of both skirts of the cylinder block, the oil pan having a deep first portion on a front side and a shallow second portion on a rear side, the first and second portions being connected to each other; flanges integrally formed on lower ends of the skirts for having the oil pan attached thereto; and reinforcing mechanism for reinforcing the strength of both skirts. The reinforcing mechanism includes: a plate-shaped reinforcing member for reinforcing the strength of both skirts, the plate-shaped reinforcing member spanning and interconnecting portions corresponding to a range extending between the first portion of the oil pan and a portion excluding the rear end of the second portion of the oil pan; and stiffening mechanism for providing portions of the flanges corresponding to the second portion of the oil pan with a rigidity higher than that of portions of the flanges corresponding to the first portion of the oil pan.

15 Claims, 6 Drawing Sheets

ENGINE CYLINDER BLOCK REINFORCING STRUCTURE

BACKGROUND OF THE INVENTION

This invention relates to an engine cylinder block reinforcing structure in which the skirts on both sides of a cylinder block are connected at their lower ends by a reinforcing member to reinforce the cylinder block.

A known cylinder block reinforcing structure as disclosed in e.g. the specification of Japanese Utility Model Publication (KOKOKU) No. 55-40360 includes a reinforcing member (vibration-proof structure) attached to the lower end of the cylinder block together with an oil pan. In the cylinder block reinforcing structure, the skirts on both sides of the cylinder block are connected at their lower ends by the reinforcing member, whereby vibration of the skirts is suppressed. This serves to enhance durability and reduce vibration-induced noise. As set forth in the aforementioned specification, the reinforcing member comprises a frame-shaped member formed by forging or a metal plate material bent into a plate-shaped configuration by pressing.

A structure in which the rear side of the engine is shallowly formed is often employed as the oil pan attached to the lower end of the cylinder block. If the above-described reinforcing structure is applied to a cylinder block to which the oil pan having the aforementioned configuration is attached, interference between the oil pan and the reinforcing member on the rear side of the engine where the oil pan in shallowly formed cannot be avoided. This makes it necessary to dispose the reinforcing member at a portion of the lower ends of the skirts which exclude a predetermined range on the rear side of the engine. However, adopting such an arrangement results in a cantilever-type structure in which the lower ends of the skirts on both sides of the block are connected solely at their front sides. Consequently, the rear end of the reinforcing member serves as a fulcrum and vibration, particularly in the lateral direction, readily occurs at the portions of the skirts rearwardly of the fulcrum.

Furthermore, in the power plant wherein the transmission is connected to the engine, vertical vibration is a problem. In such case the point at which the engine and transmission are connected is the weakest in terms of strength, so that it is necessary to increase the rigidity of the connection with respect to bending or flexural vibration in the vertical direction.

SUMMARY OF THE INVENTION

Accordingly, an object of the present invention is to provide an engine block cylinder reinforcing structure in which vibration of the cylinder block skirts can be prevented with greater effectiveness while employing a structure in which the reinforcing member is so arranged as not to interfere with the oil pan formed on the rear side of the engine.

According to a first aspect of the present invention, there is provided an engine cylinder block structure comprising: a cylinder block having a lower surface and integrally formed to include skirts projecting downwardly from both sides of the lower surface; an oil pan attached to lower surfaces of both skirts of the cylinder block for receiving engine oil used inside the cylinder block, the oil pan having a deep first portion on a front side and a shallow second portion on a rear side, the first and second portions being connected to each other; flanges integrally formed on lower ends of the skirts for having the oil pan attached thereto; and reinforcing means for reinforcing the strength of both skirts. The reinforcing means includes: a plate-shaped reinforcing member for reinforcing the strength of both skirts, the plate-shaped reinforcing member spanning and interconnecting portions corresponding to a range extending between the first portion of the oil pan and a portion excluding the rear end of the second portion of the oil pan; and stiffening means for providing portions of the flanges corresponding to the second portion of the oil pan with a rigidity higher than that of portions of the flanges corresponding to the first portion of the oil pan.

According to a second aspect of the present invention, there is provided an engine cylinder block structure comprising: a cylinder block having a lower surface and integrally formed to include skirts projecting downwardly from both sides of the lower surface; an oil pan attached to lower surfaces of both skirts of the cylinder block for receiving engine oil used inside the cylinder block, the oil pan having a deep first portion on a front side and a shallow second portion on a rear side, the first and second portions being connected to each other; mounting flanges for having a transmission housing mounted thereon, the mounting flanges being integrally formed on respective ones of the flanges at the rear end of the lower surfaces of the skirts of the cylinder block so as to protrude laterally outward from the flanges; and reinforcing means for reinforcing the strength of both skirts. The reinforcing means includes: a reinforcing member formed to have a downwardly projecting configuration and to include flanges at both edges thereof in the lateral direction for being bolted to lower end surfaces of the skirts, the reinforcing member being arranged in a region of the lower surface of the cylinder block which excludes a range in which the mounting flanges are disposed; and a plurality of reinforcing bars arranged at positions between mutually adjacent cylinders of the engine, each of the reinforcing bars extending in a direction which connects both edges of the reinforcing member in the lateral direction. The reinforcing member has portions of a generally V-shaped cross section corresponding to portions at which the reinforcing bars are attached, and portions of a generally arcuate cross section corresponding to areas between the portions at which the reinforcing bars are attached. Both ends of the reinforcing bars are fixedly secured to a flat portion of a generally V-shaped cross section of the reinforcing member. Upper surfaces of the reinforcing bars are set to approximately the same height as the flanges formed on the lower surface of the reinforcing member on both sides thereof. A space mutually communicating the front and back of the reinforcing member is formed below central portions of the reinforcing bars.

According to a third aspect of the present invention, there is provided a multiple-cylinder engine comprising: a cylinder block having a lower surface and integrally formed to include skirts projecting downwardly from both sides of the lower surface; transmission mounting flanges formed on the rear portions of the lower surfaces of the skirts of the cylinder block so as to protrude laterally outward from respective skirts and flare rearwardly thereof; an oil pan attached to the lower surfaces of both skirts of the cylinder block for receiving engine oil used inside the cylinder block, the oil pan having a deep first portion on a front side and a shallow second portion on a rear side, the first and second portions being connected to each other; and reinforcing means for reinforcing the strength of both skirts. The reinforcing means includes: a plate-shaped reinforcing member for reinforcing the strength of both skirts, the plate-shaped reinforcing member spanning and interconnecting portions corresponding to a range extending between the first portion of the oil pan and a portion excluding the rear end of the second portion of the oil pan, the reinforcing member having a rear end extended to overlap, in relation to a longitudinal direction, front ends of the transmission mounting flanges, and formed so as to project downwardly; and a plurality of reinforcing bars arranged above the reinforcing member situated between mutually adjacent bores of the engine for connecting and securing laterally-directed side walls of the reinforcing member. The reinforcing member has flanges formed integrally with both laterally-directed ends thereof, the flanges being secured to the lower surfaces of respective skirts. Upper surfaces of the reinforcing bars are set to approximately the same height as the flanges provided on the reinforcing member. A space mutually communicating the front and back of the reinforcing bars is defined between lower surfaces of central portions of the reinforcing bars and an upper surface of a downwardly projecting portion of the reinforcing member.

Thus, in accordance with the present invention as described above, the lower ends of both skirts are connected and reinforced for the reinforcing member on the front side of the engine. Meanwhile, on the rear side of the engine where the reinforcing member is not provided in order to prevent interference between the oil pan and the reinforcing member, vibration is suppressed by increasing the rigidity of the skirts themselves.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
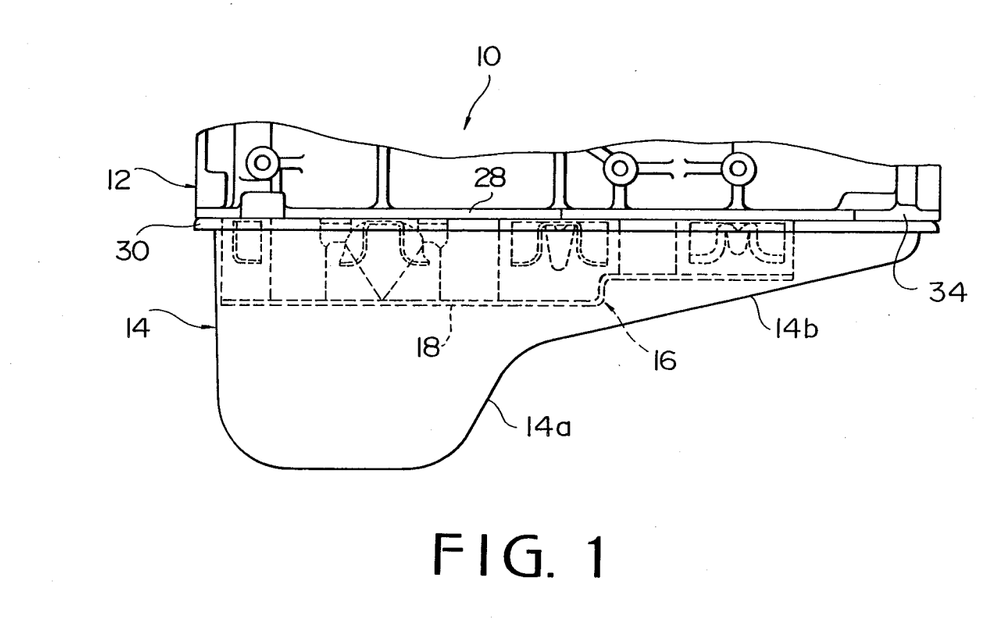
FIG. 1 is a front view illustrating the construction of the lower portion of a cylinder block in an embodiment of the present invention.
Figure 2:
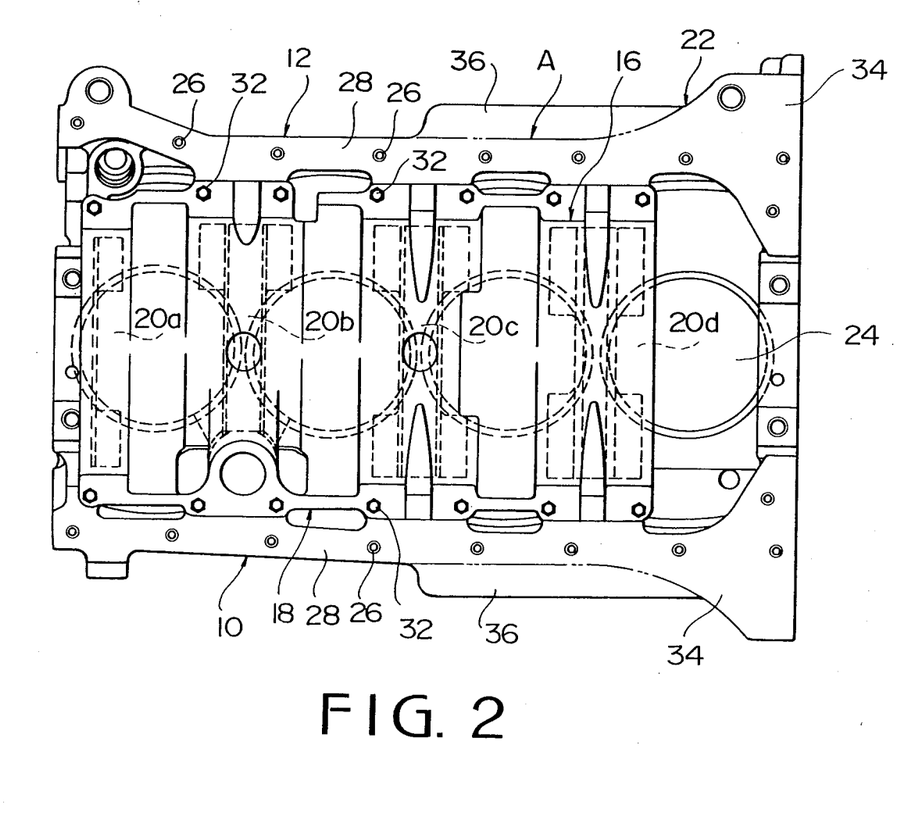
FIG. 2 is a bottom view of the cylinder block in a state where an oil pan has been detached.

FIG. 1 is a front view illustrating the principal structure of an embodiment in which the cylinder block structure of the invention is applied to a straight type four-cylinder engine, and FIG. 2 is a bottom view illustrating the cylinder block in a state where an oil pan has been detached. In FIGS. 1 and 2, a cylinder block 10 includes skirts 12 on the lower portion thereof on both sides in relation to the lateral direction. The skirts 12 are formed integrally with the cylinder block 10 and extend downwardly therefrom. An oil pan 14 serving as a receptacle for engine oil used in the cylinder block 10 is attached to the lower faces of the two skirts 12 so as to span the skirts. In order to reinforce the strength of the skirts 12 of cylinder block 10, a reinforcing mechanism 16 is provided on the lower portion of the cylinder block 10.

The oil pan 14 comprises a first portion 14a designed to be comparatively deep on the front side of the engine, and a second portion 14b designed to have a gradually shallower depth on the rear side of the engine. The oil pan 14 is attached to the lower ends of the skirts 12. The reinforcing mechanism 16 comprises a reinforcing member 18 interconnecting the lower ends of the cylinder block skirts 12, and reinforcing bars 20a, 20b, 20c, 20d, described below. The reinforcing mechanism 16 further includes a stiffening mechanism 22 for increasing the rigidity of the lower portions of skirts 12.

The reinforcing member 18 is situated on the inner side of the oil pan 14. In order to avoid interference (collision) with the oil pan having the above-described shape, the reinforcing member 18 is disposed at a portion of the lower end of the cylinder block 10 which excludes a predetermined range on the rear side of the engine (namely a rear end portion where it is substantially impossible to dispose the reinforcing member 18). In FIG. 2, numeral 24 denotes a rearmost cylinder bore, namely the fourth cylinder bore counting from the front of the engine.

The lower end of each of the skirts 12 is integrally formed to include a longitudinally extending oil pan mounting flange 28 having a plurality of bolt holes 26. Both sides of the oil pan 14 are integrally formed to include respective flanges 30 joinable to corresponding ones of the flanges 28 formed on the skirts 12. The oil pan 14 is fixedly secured to the two skirts 12 by bolts, not shown, in a state in which the flanges 28, 30 are joined to each other. A mounting face is formed on the inward portion of each flange 28 of the respective skirt 12. Both sides of the reinforcing member 18 in relation to the lateral direction thereof are fixedly secured to the mounting faces of the flanges 28 at a plurality of locations by bolts 32. The lower side of each skirt 12 at the rear end thereof is formed to include a transmission (or more specifically, a transmission case) mounting flange 34 protruding outwardly of the skirt. The front end of each flange 34 extends to a rearmost mounting position of a reinforcing bar, described below.

The flanges 28 on the lower ends of the skirts 12 are integrally provided with reinforcing portions 36 on their rearward sides extending from locations corresponding to the rear of the reinforcing member 18, namely from mounting positions of the second reinforcing bar 20c from the rear, to the transmission mounting flanges 34. The reinforcing portions 36 protrude outwardly beyond the range (the two-dot chains line A in FIG. 2) of the oil pan mounting surface. Together with the flanges 34, the reinforcing portions 36 construct the aforementioned stiffening mechanism 22. That is, owing to the presence of the reinforcing portions 36 and flanges 34, the rearward sides of the skirts 12 have more rigidity than their forward sides.

Figure 3:
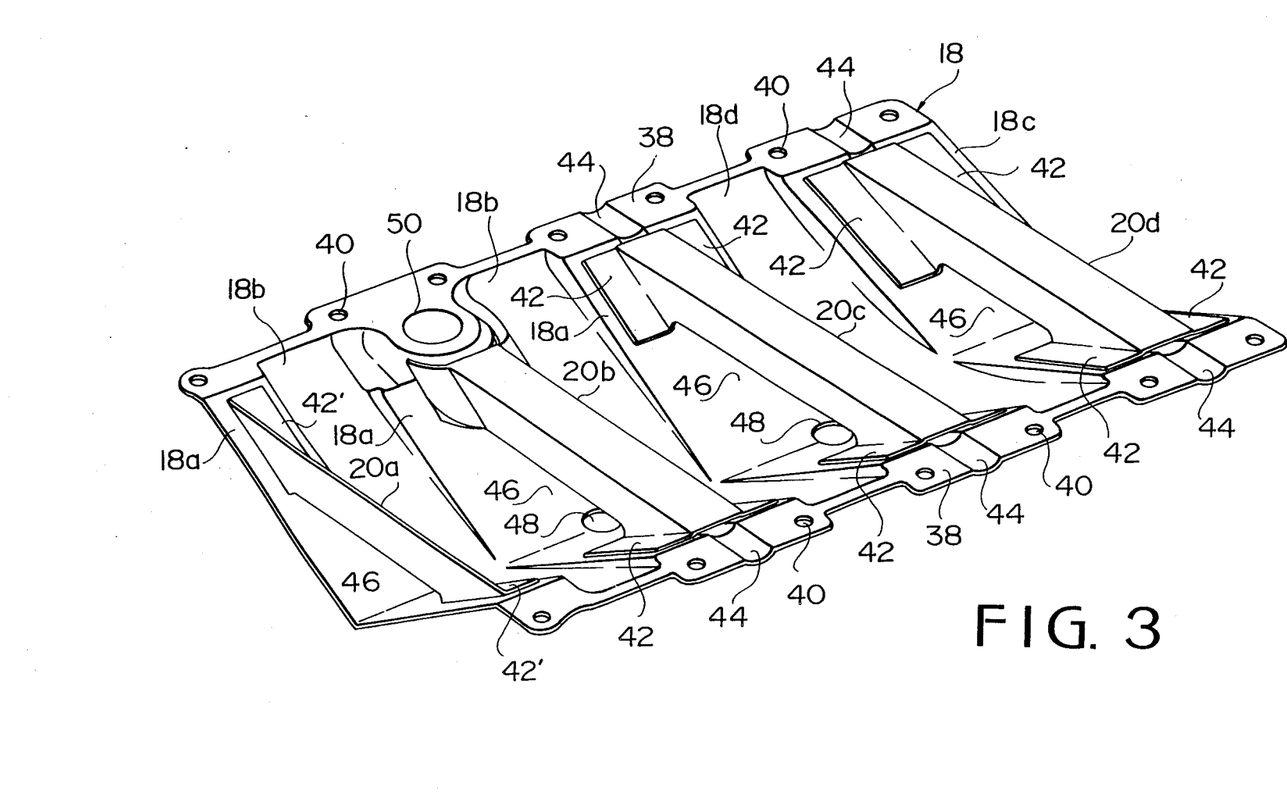
FIG. 3 is a perspective view illustrating a specific embodiment of a reinforcing member.
Figure 4:
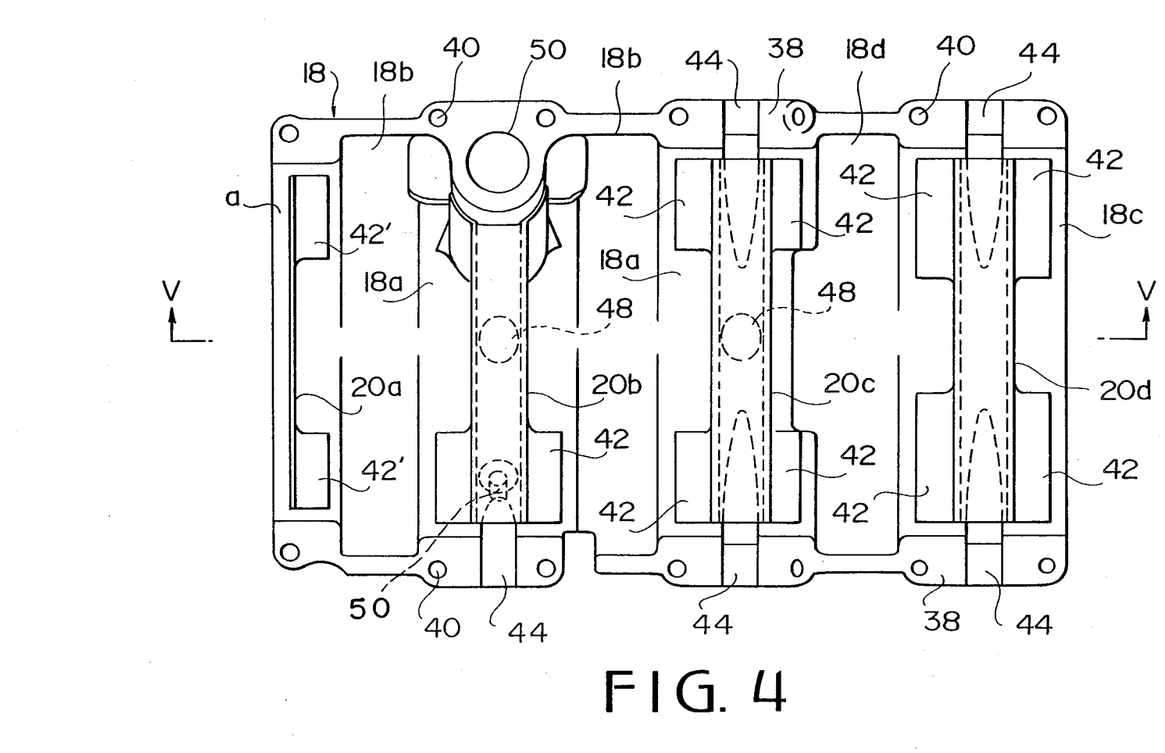
FIG. 4 is a plan view illustrating the reinforcing member of FIG. 3.
Figure 5:
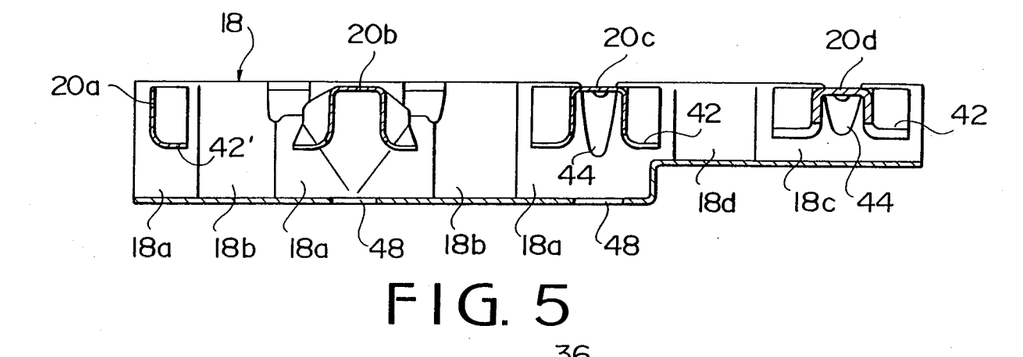
FIG. 5 is a sectional view of the reinforcing member taken along line V—V of FIG. 4.

FIGS. 3 through 5 illustrate the detailed construction of the reinforcing member 18. The reinforcing member 18 consists of a metal plate material subjected to pressing work so as to be formed into a curved configuration the central side of which in the lateral direction thereof defines a recess. Integrally provided on both sides of the reinforcing member 18 in the lateral direction thereof are flanges 38 for mounting the reinforcing member 18 on the lower end faces of the skirts 12. Formed in the flanges 38 at a plurality of locations are holes 40 for the bolts 32 (FIG. 2) screwed into the flanges 28 of the corresponding skirts 12. The reinforcing bars 20a, 20b, 20c, 20d, which extend in a direction (the lateral direction) perpendicular to that of the crankshaft, are fixedly secured at a predetermined spacing to the reinforcing member 18 by having their two ends welded thereto. The second through fourth reinforcing bars 20b, 20c, 20d underlie portions between mutually adjacent cylinders (i.e. between mutually adjacent bores) of the cylinder block 10, and the first reinforcing bar is arranged on the front end side of the engine.

In the illustrated embodiment, the reinforcing member 18 is adapted so as to be capable of being placed on the inner side of the oil pan 14 while not interfering with connecting rods of the engine. The reinforcing member 18 is formed to have a shape which will provide flatness at the welding locations of the reinforcing bars 20a-20d in order to assure reliable welded joints, and which will provide satisfactory strength. Specifically, portions 18a at which respective ones of the first through third reinforcing bars 20a through 20c are disposed, and mutually adjacent portions 18b underlying the connecting rods corresponding to the cylinders, are arranged in the range of the reinforcing member 18 which substantially corresponds to the deep first portion 14a of oil pan 14. The portions 18a, 18b are formed to have a generally V-shaped cross section defining a comparatively deep recess or valley. A portion 18c, at which the fourth reinforcing bar 20d is disposed, is arranged in the range of the reinforcing member 18 which corresponds to the somewhat deeper second portion 14b of oil pan 14. The portion 18c is formed to have a generally V-shaped cross section defining a comparatively shallow recess or valley. A portion 18d, protruding downwardly so as to avoid the locus of connecting rod revolution, is disposed in the range of reinforcing member 18 which underlies the connecting rod corresponding to the rearmost cylinder. The portion 18d is formed to have an arcuate cross section.

Among the reinforcing bars 20a through 20d, the second through fourth reinforcing bars 20b through 20d, namely the bars other than the first on the front end side of the engine, are formed to have a generally inverted U-shaped cross section (i.e. a trough-shaped configuration open at the bottom, as clearly shown in FIG. 5). A pair of welding tabs 42 are integrally formed at both ends of the bars 20b through 20d. The welding tabs 42 are spot-welded to the upper surface of the reinforcing member 18 at the corresponding welding locations. Beads (grooves) 44 are formed in the reinforcing member 18 in the vicinity of the welding locations. The beads 44 extend from the flanges 38 to the V-shaped wall portions in the lateral direction. By forming the beads 44, the geometrical moment of inertia of the flanges 38 is enlarged, thereby raising the strength of these flanges. The first reinforcing bar 20a mounted on the front end portion of the reinforcing member 18 merely comprises an upstanding wall since the mounting width thereof is limited. Both ends of the bar 20a are integrally provided with welding tabs 42'.

The rigidity of the reinforcing member 18 is raised by the first through fourth reinforcing bars 20a-20d. One requisite of the stiffening mechanism 22 in the illustrated embodiment is that the fourth reinforcing bar 20d situated at the rear end of the reinforcing member 18 be formed thicker than each of the other first through third reinforcing bars 20a-20c. The rigidity of this thickened portion will thus be set higher than that of the other portions.

Formed in the central portion of the reinforcing member 18 laterally thereof between the lower surface of each of the reinforcing bars 20a-20d and the upper surface of the reinforcing member 18 is a space 46 communicating the front and back sides of the reinforcing bars 20a-20d. Oil is capable of flowing freely through the space 46. Oil introducing ports 48 are formed in portions of the reinforcing member 18 directly underlying the second and third reinforcing bars 20b, 20c. The ports 48 introduce oil, which is used in the engine and temporarily received in the reinforcing member 18, into the oil pan 14. Thus, oil which drops onto the reinforcing member 18 from the engine cylinders is discharged into the oil pan 14 from the oil introducing ports 48 and from the front and rear edges of the reinforcing member 18.

A pipe insertion hole 50 into which an oil supply pipe (not shown) is inserted is formed in a side of the reinforcing member 18 at a predetermined location. A pin 52 (FIG. 4) for supporting a pipe led out from an oil strainer (not shown) is attached to the reinforcing member 18 at another predetermined location.

Figure 6:
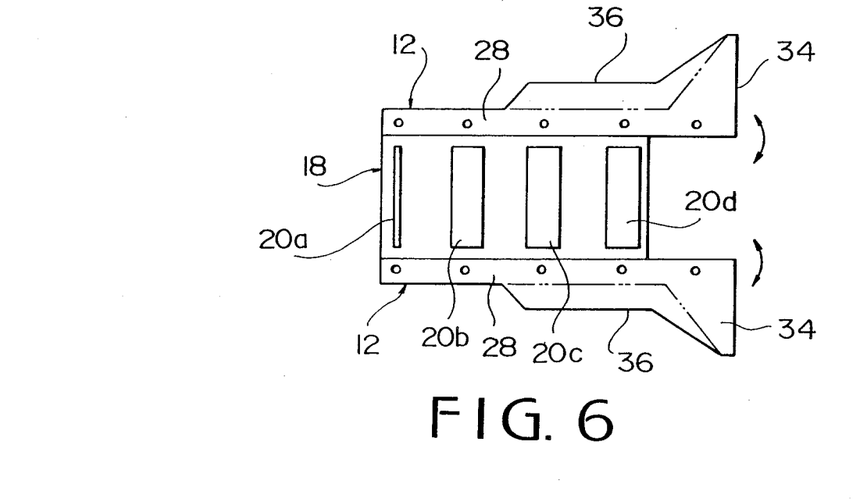
FIG. 6 is a schematic view of the lower end of a cylinder block and illustrates a vibration-preventing effect.

The vibration-preventing action in the cylinder block structure constructed as set forth above will now be described with reference to FIG. 6. The reinforcing member 18 interconnecting the lower ends of the skirts 12 situated on the lower surface of the cylinder block 10 at both sides thereof is arranged in a region which excludes a predetermined range (the rear end portions) of the skirts 12 on the rearward sides thereof so as to avoid interfering with the oil pan 14 having the aforementioned shape. Therefore, while the front portions of the skirts 12 are reinforced and stiffened by the reinforcing member 18, the rear portions of the skirts 12 project in cantilever fashion and tend to vibrate as before, as shown by the arrows in the FIG. 6. However, in the illustrated embodiment, the outwardly protruding reinforcing portions 36 are provided as structural elements of the stiffening mechanism 22 rearwardly of the flanges 28 of skirts 12. As a result, the rigidity of rearward portions of flanges 28 is increased to suppress the above-mentioned vibration.

Further, in the illustrated embodiment, the fourth reinforcing bar 20d situated at the rear end of the reinforcing member 18 is thickened, thereby increasing the rigidity of the portion constituting the fulcrum of rotation of the portions on the rearward sides of the skirts 12. As a result, the vibration of the rear portions of skirts 12 is suppressed to a greater degree.

It goes without saying that the invention is not limited to the arrangement of the above-described embodiment but can be modified in various ways without departing from the scope of the claims.

Figure 7:
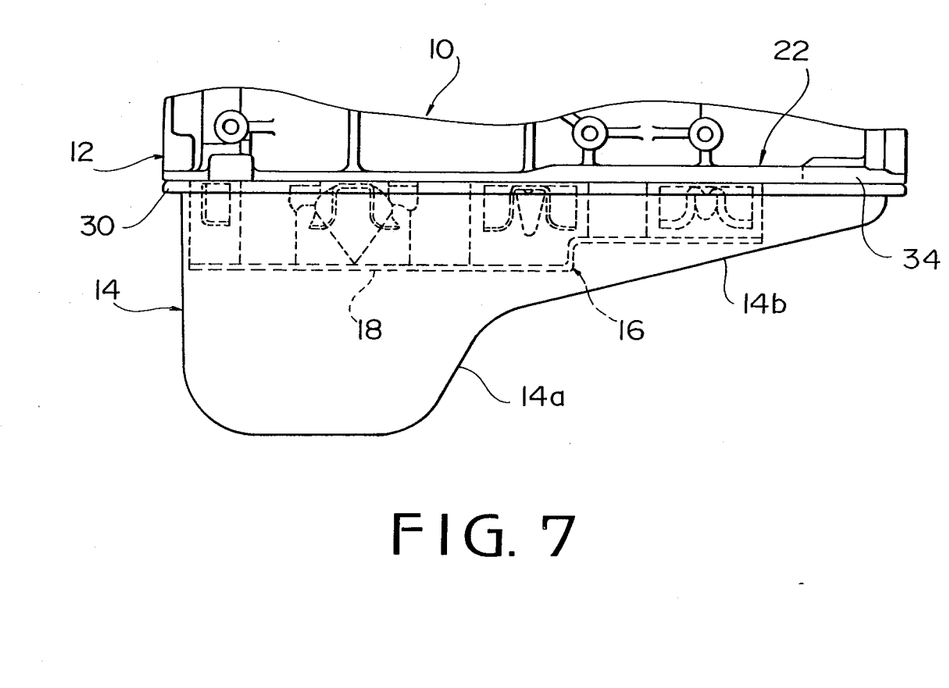
FIG. 7 is a front view illustrating the construction of the lower portion of a cylinder block in another embodiment of the present invention.

For example, it has been described in connection with the foregoing embodiment that the outwardly protruding reinforcing portions 36 are provided in the stiffening mechanism 22 as a structure for stiffening the rear portions of the skirts 12, as is evident from FIG. 2. However, the invention is not limited to this arrangement, for the stiffening mechanism 22 can be modified, as shown in FIG. 7, by thickening the flanges 28 of the rear portions of skirts 12 to raise the rigidity of the skirts. Furthermore, in the reinforcing mechanism 16 interconnecting the lower ends of the two skirts 12, the reinforcing member 18 is not limited to that having the shape described above in the illustrated embodiment. The reinforcing member 18 can be modified in terms of design without departing from the scope of the invention.

What is claimed is:

1. An engine cylinder block structure comprising:
   a cylinder block integrally formed to include skirts projecting downwardly from both sides of a lower surface of the cylinder block;
   an oil pan attached to lower surfaces of both skirts of said cylinder block for receiving engine oil used inside said cylinder block, said oil pan having a deep first portion on a front side and a shallow second portion on a rear side, said first and second portions being connected to each other and said second portion having a rear end;
   flanges integrally formed on lower ends of said skirts for having said oil pan attached thereto; and
   reinforcing means for reinforcing the strength of both skirts;
   said reinforcing means including:
   a plate-shaped reinforcing member for reinforcing the strength of both skirts, said plate-shaped reinforcing member spanning and interconnecting sections of said skirts in a range extending between the first portion of said oil pan and the second portion of said oil pan excluding the rear end of the second portion of said oil pan; and
   stiffening means for providing parts of said flanges adjacent the second portion of said oil pan with a rigidity higher than that of parts of said flanges adjacent the first portion of said oil pan.

2. The engine cylinder block structure according to claim 1, which further comprises:
   protruding members for having a transmission housing mounted thereon, said protruding members being integrally formed on respective ones of said flanges at a rear end of the lower surface of said cylinder block so as to protrude laterally outwardly from said flanges, said protruding member having a front end and said reinforcing member having a rear end; and
   wherein a part of each flange adjacent the front end of each protruding member is set so as to overlap a part of the flange adjacent the rear end of said reinforcing member, each of said protruding members constituting said stiffening means.

3. The engine cylinder block structure according to claim 2, wherein said stiffening means has reinforcing areas formed integrally with respective ones of said flanges, said reinforcing areas protruding laterally outwardly from said flanges in a region of said second portion, each of said reinforcing areas being formed integrally with a corresponding one of said protruding members.

4. The engine cylinder block structure according to claim 2, wherein said stiffening means includes a thicker flange in the region of said second portion than in the region of said first portion.

5. The engine cylinder block structure according to claim 2, wherein said reinforcing member is formed into a generally bent, downwardly projecting shape, and said reinforcing means has a plurality of reinforcing bars arranged to span both edges of said reinforcing member at positions between mutually adjacent cylinders of the engine, each of said reinforcing bars extending laterally of said cylinder block.

6. The engine cylinder block structure according to claim 5, wherein said protruding members are arranged in such a manner that their front end portions are located adjacent a reinforcing bar situated at a rearmost portion, and said reinforcing member is arranged in such a manner that its rear end extends rearwardly of said reinforcing bar situated at the rearmost portion.

7. The engine cylinder block structure according to claim 5, wherein said reinforcing member has sections of a generally V-shaped cross section adjacent points at which said reinforcing bars are attached, and sections of a generally arcuate cross section adjacent areas between the points at which said reinforcing bars are attached.

8. The engine cylinder block structure according to claim 5, wherein:
   each of said reinforcing bars is formed into a generally inverted U-shaped configuration and is attached to said reinforcing member by having both ends thereof fixedly secured to an inner surface of said reinforcing member at both edges thereof in the lateral direction;
   a space mutually communicating front and back regions of said reinforcing member being defined between lower surfaces of said reinforcing bars and an upper surface of said reinforcing member; and
   at least one through-hole for introducing engine oil, which has dropped onto the reinforcing member, into said oil pan, being formed on a part of said reinforcing member underlying said reinforcing bars.

9. The engine cylinder block structure according to claim 5, wherein each of said reinforcing bars is formed into a generally inverted U-shaped configuration and is attached to said reinforcing member by having both ends thereof fixedly secured to an inner surface of said reinforcing member at both edges thereof in the lateral direction;
   and which further comprises:
   grooves for increasing a geometrical moment of inertia of said reinforcing member, said grooves being formed in said reinforcing member, said grooves extending across said flange of said reinforcing member to a point adjacent where said reinforcing bars are secured to said reinforcing member.

10. An engine cylinder block structure comprising:
    a cylinder block integrally formed to include skirts projecting downwardly from both sides of a lower surface;
    an oil pan attached to lower surfaces of both skirts of said cylinder block for receiving engine oil used inside said cylinder block, said oil pan having a deep first portion on a front side and a shallow second portion on a rear side, said first and second portions being connected to each other;
    mounting flanges for having a transmission housing mounted thereon, said mounting flanges being integrally formed on respective ones of flanges located at a rear end of the lower surfaces of the skirts of said cylinder block so as to protrude laterally outwardly from said flanges of said skirts; and
    reinforcing means for reinforcing the strength of both skirts;
    said reinforcing means including:

a reinforcing member formed to have a downwardly projecting configuration and to include flanges at both edges thereof in the lateral direction for being bolted to lower end surfaces of said skirts, said reinforcing member being arranged in a region of the lower surface of said cylinder block substantially other than where said mounting flanges are disposed, and a plurality of reinforcing bars arranged at positions between mutually adjacent cylinders of the engine, each of said reinforcing bars extending in a direction which connects both edges of said reinforcing member in the lateral direction;

said reinforcing member having sections of a generally V-shaped cross section at points where said reinforcing bars are attached, and sections of a generally arcuate cross section at areas between the points at which said reinforcing bars are attached;

both ends of said reinforcing bars being fixedly secured to a flat area of a generally V-shaped cross section of said reinforcing member;

upper surfaces of said reinforcing bars being set to approximately the same height as the flanges formed on the lower surface of said reinforcing member on both sides thereof; and a space mutually communicating front and back regions of said reinforcing member being formed below central portions of said reinforcing bars.

11. The engine cylinder block structure according to claim 10, wherein said reinforcing member has a downwardly projecting first region adjacent the first portion of said oil pan and a downwardly projecting second region adjacent the second portion of said oil pan, said first region of the reinforcing member projecting downwardly by a greater amount than said second region of the reinforcing member.

12. The engine cylinder block structure according to claim 10, wherein both ends of each of said reinforcing bars each has a generally hat-shaped cross section, and grooves for increasing a geometrical moment of inertia of said reinforcing member being formed in the reinforcing member, said grooves extending across said flange of said reinforcing member to a point adjacent where said reinforcing bars are fixedly secured to said reinforcing member.

13. The engine cylinder block structure according to claim 10, wherein an oil drain hole is formed in a portion of said reinforcing member underlying said reinforcing bars.

14. The engine cylinder block structure according to claim 10, wherein a rearmost reinforcing bar among said plurality of reinforcing bars is formed to a plate thickness greater than that of the other reinforcing bars.

15. A multiple-cylinder engine comprising:
a cylinder block integrally formed to include skirts projecting downwardly from both sides of a lower surface of the cylinder block;
transmission mounting flanges formed on rear ends of lower surfaces of the skirt of said cylinder block to protrude laterally outwardly from respective skirts and flare rearwardly thereof;
an oil pan attached to the lower surfaces of both skirts of said cylinder block for receiving engine oil used inside said cylinder block, said oil pan having a deep first portion on a front side and a shallow second portion on a rear side, said first and second portions being connected to each other;
reinforcing means for reinforcing the strength of both skirts;
said reinforcing means including:
a plate-shaped reinforcing member spanning and interconnecting sections of said skirt in a range extending between the first portion of said oil pan and the second portion of said oil pan excluding the rear end of the second portion of said oil pan, said reinforcing member having a rear end extended to overlap, in relation to a longitudinal direction, front ends of said transmission mounting flanges, and formed so as to project downwardly; and
a plurality of reinforcing bars arranged above said reinforcing member situated between mutually adjacent bores of the engine for connecting and securing laterally-directed side walls of said reinforcing member;
said reinforcing member having flanges formed integrally with both laterally-directed ends thereof, said flanges being secured to the lower surfaces of respective skirts;
upper surfaces of said reinforcing bars being set to approximately the same height as the flanges provided on said reinforcing member; and
a space mutually communicating front and back regions of said reinforcing member being defined between lower surfaces of central potions of said reinforcing bars and an upper surface of a downwardly projecting region of said reinforcing member.

* * * * *